United States Patent
Felty, Jr. et al.

(10) Patent No.: US 8,906,466 B2
(45) Date of Patent: *Dec. 9, 2014

(54) ESTERIFIED LIGNOCELLULOSIC MATERIALS AND METHODS FOR MAKING THEM

(75) Inventors: Jarvey Eugene Felty, Jr., Gray, TN (US); Timothy L. Guinn, Bluff City, TN (US); David Chris Spencer, Kingport, TN (US); John Michael Allen, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/817,744

(22) Filed: Jun. 17, 2010

(65) Prior Publication Data

US 2011/0091736 A1    Apr. 21, 2011

Related U.S. Application Data

(60) Provisional application No. 61/220,427, filed on Jun. 25, 2009.

(51) Int. Cl.
| | |
|---|---|
| B05D 7/06 | (2006.01) |
| C08L 1/12 | (2006.01) |
| B05D 3/04 | (2006.01) |
| B05D 1/18 | (2006.01) |
| B05D 1/36 | (2006.01) |
| B27K 3/50 | (2006.01) |
| B27K 3/36 | (2006.01) |
| B05D 1/00 | (2006.01) |
| B27K 3/02 | (2006.01) |
| B27K 3/34 | (2006.01) |
| B27K 5/00 | (2006.01) |
| C08H 8/00 | (2010.01) |
| C08B 3/06 | (2006.01) |
| C08L 97/02 | (2006.01) |

(52) U.S. Cl.
CPC ............... *C08L 1/12* (2013.01); *B05D 3/0453* (2013.01); *B05D 1/18* (2013.01); *B05D 1/36* (2013.01); *B05D 3/04* (2013.01); *B27K 3/50* (2013.01); *B27K 3/36* (2013.01); *B05D 3/0433* (2013.01); *B05D 1/60* (2013.01); *B05D 7/06* (2013.01); *B27K 3/0271* (2013.01); *B27K 3/0278* (2013.01); *B27K 3/346* (2013.01); *B27K 5/001* (2013.01); *C08H 8/00* (2013.01); *C08B 3/06* (2013.01); *C08L 97/02* (2013.01)
USPC .......... 427/435; 427/337; 427/342; 427/393; 427/397; 427/430.1; 427/440

(58) Field of Classification Search
None
See application file for complete search history.

(56) References Cited

U.S. PATENT DOCUMENTS

| | | | |
|---|---|---|---|
| 2,060,902 A | 11/1936 | Stamm | |
| 2,273,039 A | 2/1942 | Hudson | |
| 2,417,995 A | 3/1947 | Stamm et al. | |
| 2,780,511 A * | 2/1957 | Takero Takagi | ................. 8/121 |
| 3,094,431 A | 6/1963 | Goldstein et al. | |
| 3,403,145 A | 9/1968 | Edge, Jr. et al. | |
| 4,377,040 A | 3/1983 | Giebeler et al. | |
| 4,388,378 A | 6/1983 | House et al. | |
| 4,592,962 A | 6/1986 | Aoki et al. | |
| 4,804,384 A | 2/1989 | Rowell et al. | |
| 5,431,868 A | 7/1995 | Hirano | |
| 5,506,026 A | 4/1996 | Iwata et al. | |
| 5,525,721 A | 6/1996 | Ohshima et al. | |
| 5,554,429 A | 9/1996 | Iwata et al. | |
| 5,608,051 A | 3/1997 | Nelson et al. | |
| 5,736,218 A | 4/1998 | Iwata et al. | |
| 5,777,101 A | 7/1998 | Nelson et al. | |
| 5,821,359 A | 10/1998 | Nelson et al. | |
| 5,922,420 A | 7/1999 | Dahlin et al. | |
| 6,376,582 B1 | 4/2002 | Iwata et al. | |
| 6,602,451 B1 | 8/2003 | Korai et al. | |
| 6,632,326 B1 | 10/2003 | Hirano et al. | |
| 6,638,457 B2 | 10/2003 | Inagaki | |
| 6,723,766 B1 | 4/2004 | Hirano et al. | |
| 7,300,705 B2 | 11/2007 | Neogi et al. | |
| 2004/0258941 A1 * | 12/2004 | Neogi et al. | ................ 428/537.1 |
| 2005/0013939 A1 | 1/2005 | Vinden et al. | |
| 2005/0020829 A1 | 1/2005 | Yamamoto et al. | |
| 2005/0070438 A1 | 3/2005 | Hoyvik et al. | |
| 2006/0083910 A1 | 4/2006 | Hoglinger et al. | |
| 2007/0056655 A1 | 3/2007 | Vinden | |
| 2007/0128422 A1 | 6/2007 | Nasheri et al. | |
| 2009/0110842 A1 | 4/2009 | Vinden et al. | |
| 2010/0331531 A1 | 12/2010 | Mykytka | |

(Continued)

FOREIGN PATENT DOCUMENTS

| | | |
|---|---|---|
| BE | 1017214 A6 | 5/2008 |
| CN | 101879736 A | 11/2010 |

(Continued)

OTHER PUBLICATIONS

Brelid, P. Larsson and Simonson, R.; "Acetylation of Solid Wood Using Microwave Heating, Part 2. Experiments in Laboratory Scale"; Holz als Roh—and Werkstoff; 57, pp. 383-389; (1999).

Brelid, P. Larsson; Simonson, R. and Risman, P. O.; "Acetylation of Solid Wood Using Microwave Heating, Pat 1. Studies of Dielectric Properties"; Holz als Roh und Werkstoff; 57, pp. 259-263; (1999).

Brelid, P. Larsson; "Acetylation of Solid Wood, Wood Properties and Process Development"; Department of Forest Products and Chemical Engineering, Chalmers University of Technology, Göteborg, Sweden, (1998).

Klinga, Leif O. and Tarkow, Harold; "Dimensional Stabilization of Hardboard by Acetylation" Tappi; vol. 49, No. 1, pp. 23-27; Jan. 1966.

Larsson, P. and Simson, R.; "A Study of Strength, Hardness and Deformation of Acetylated Scandinavian Softwoods"; Holz als Roh—und Werkstoff; 52, pp. 83-86; (1994).

(Continued)

*Primary Examiner* — Erma Cameron
(74) *Attorney, Agent, or Firm* — William K. McGreevey

(57) ABSTRACT

Methods of making esterified lignocellulosic materials and resulting compositions and articles are disclosed.

33 Claims, No Drawings

(56) References Cited

U.S. PATENT DOCUMENTS

| | | | |
|---|---|---|---|
| 2011/0009610 A1 | 1/2011 | Petersen et al. | |
| 2011/0045268 A1 | 2/2011 | Girotra | |
| 2011/0091736 A1 | 4/2011 | Felty, Jr. et al. | |
| 2013/0202789 A1 | 8/2013 | Cwirko et al. | |

FOREIGN PATENT DOCUMENTS

| | | | |
|---|---|---|---|
| EP | 0 213 252 A1 | | 3/1987 |
| EP | 0 680 810 A1 | | 11/1995 |
| EP | 0 909 618 A2 | | 4/1999 |
| GB | 579 255 | | 7/1946 |
| GB | 963 929 | | 7/1964 |
| GB | 964197 | * | 7/1964 |
| GB | 2 271 570 A | | 4/1994 |
| JP | 63-199604 | | 8/1988 |
| JP | 5269710 A | | 10/1993 |
| JP | 6198610 A | | 7/1994 |
| JP | 7009418 A | | 1/1995 |
| JP | H10235620 A | | 9/1998 |
| JP | 11348010 A | | 12/1999 |
| JP | 2000-0280208 A | | 10/2000 |
| RU | 2391202 C1 | | 6/2010 |
| WO | WO 95/06777 | | 8/1993 |
| WO | WO 2005/077626 A1 | | 8/2005 |
| WO | WO 2009/095687 | * | 8/2009 |

OTHER PUBLICATIONS

Morozov, A.; "Characteristics of Acetylation of Ground Wood with Acetic Anhydride"; Proceedings of the Latvian Agricultural Academy; No. 206, pp. 5-11; 1983.

Nikitina, N. and Otelsnov, Yu.; "Experience in Commercializing the Results of Research on Acetylation of Wood"; Tr. LSKHA; No. 88, pp. 85-88; 1976.

Ozolina, I. O. and Shvalbe, K. P.; "Acetylation of Wood and Biological Testing of Acetylated Samples"; Izv. Akad. Nauk Latv. SSR; No. 9 (230), pp. 56-59; 1966.

Simonson, Rune and Rowell, Roger; "A New Process for the Continuous Acetylation of Lignocellulosic Fiber"; Proceedings of Fifth Pacific Rim Bio-Based Composite Symposium, P. D. Evans, ed. Canberra, Australia, pp. 190-196; Dec. 2000.

Notification of Transmittal of the International Search Report and the Written Opinion of the International Searching Authority, or the Declaration date of mailing Aug. 19, 2010 received in corresponding International Application No. PCT/US10/01806.

Notification of Transmittal of the International Search Report and the Written Opinion of the International Searching Authority, or the Declaration, date of mailing Sep. 8, 2010 received in corresponding International Application No. PCT/US10/01805.

Co-pending U.S. Appl. No. 12/817,767, filed Jun. 17, 2010, Mykytka; now U. S. Publication No. 2010-0331531.

Arni, P. C. et al.; "Chemical Modification of Wood. II. Use of Trifluoroacetic Acid as Catalyst for the Acetylation of Wood"; Journal of Applied Chemistry; May 1961; 11; pp. 163-170.

Arora, Madhu et al.; "Effect of Acetylation Time on Degree of Acetylation in Wood"; Holzforschung und Holzverwertung; 1980; 32(6); pp. 138-139.

Dev, Indra and Pachauri, Dinesh; "A Note of New Approach to Vapour Phase Acetylation of Air Dry Wood"; Journal of the Timber Development Association of India; 2000; vol. 46, No. 1 & 2; pp. 36-40.

Fadl, N. A. and Basta, A. H.; "Enhancement of the Dimensional Stability of Natural Wood by Impregnates"; Pigment & Resin Technology; 2005; 34/2, pp. 72-87.

Goldstein, Irving S. et al.; "Acetylation of Wood in Lumber Thickness"; Forest Products Journal; Aug. 1961; 11, pp. 363-70.

Horn, Otto; "Acetylation of Beechwood"; Chemische Berichte; 1928; 61, pp. 2542-2542.

Kumar, Satish and Kohli, Kamini; "Chemical Modification of Wood: Reaction with Thioacetic Acid and its Effect on Physical and Mechanical Properties and Biological Resistance"; Renewable-Resource Materials, New Polymer Sources; Plenum Press, New York and London; 1986; 33, pp. 147-160.

Manchester, D. F. et al.; "The Brightening of Groundwood"; Svensk Papperstidning; Oct. 1960; 63(20), pp. 699-706.

Miljković, Jovan and Ðiporović, Milanka; "The Acetylation of Pine and Beech for Particleboard Production"; Journal of the Serbian Chemical Society; 1994; 59(4), pp. 255-264.

Mohebby, B. and Hadjihassani, R.; "Moisture Repellent Effect of Acetylation on Poplar Fibers"; Journal of Agricultural Science and Technology; 2008; vol. 10, No. 2, pp. 157-163.

Nasheri, Kourosh et al.; "Enhancing Dimensional Stability and Durability of Radiata Pine Wood: A Novel Technology"; Wood Processing Newsletter; May 2004; Issue No. 35.

Nishino, Yoshihiko; "Simplified Vaper Phase Non-Catalytic Acetylation of Small Speciments of Hinoki (*Chamaecyparis obtuse*) Wood with Acetic Anhydride"; Mokuzai Gakkaishi; 1991; vol. 37, No. 4, pp. 370-374.

Obataya, Eiichi and Minato, Kazuya; "Potassium Acetate-Catalyzed Acetylation of Wood: Extraordinarily Rapid Acetylation at 120° C"; Wood Science Technology; 2008; 42, pp. 567-577.

Obataya, Eiichi and Minato, Kazuya; "Potassium Acetate-Catalyzed Acetylation of Wood at Low Temperatures II: Vapor Phase Acetylation at Room Temperature"; Journal of Wood Science; 2009; 55(1), pp. 23-26.

Ohkoshi, Makoto and Kato, Atsushi; Determination of Substituent Distribution of DMSO-Soluble Portion of Acetylated Wood Meal by $^{13}$C-NMR Spectroscopy; Mokuzai Gakkaishi; 1993; vol. 39, No. 7, pp. 849-854.

Ota, Michikazu et al.; Light-Induced Color Changes of Acetylated Veneers of Kiri (*Paulownia tomentosa* Steud.); Mokuzai Gakkaishi; 1997; vol. 43, No. 9, pp. 785-791.

Otlesnov, Yu and Nikitina, N.; "Experience in Operation of a Production Plant for Wood Modification by Acetylation"; Trudy Latviiskoi Sel'skokhozyaistvennoi Akademii; 1977; No. 130, pp. 50-53.

Ozolina, I. and Shvalbe, K.; "Acetylation of Wood"; Latvijas Lauksaimniecibas Akademijas Raksti; 1969; No. XXIII, pp. 306-311.

Ozolinya, I.; "Surface Protective Treatment of Wood and Plywood with Monomers"; LLA Taksti; 1981; 185, pp. 45-47.

Popper, Rudolf and Bariska, Mihaly; "Acylation of Wood Part 3: Swelling and Shrinkage Properties"; Holz als Ron—und Werkstoff; 1975; 33(11), pp. 415-419.

Ramsden, M. J. and Blake, F. S. R.; "A Kinetic Study of Acetylation of Cellulose, Hemicellulose and Lignin Components in Wood"; Wood Science and Technology; 1997; 31(1), pp. 45-50.

Rasmanis, P.; "An Apparatus for Acetylating Wood with Gaseous Acetic Anhydride"; Proceedings of the LSKhA; 1983; Issue 206, pp. 16-19.

Risi, J, and Arseneau, Donald F.; "Dimensional Stabilization of Wood"; Forest Products Journal; Jun. 1957; 7, pp. 210-213.

Rowell, Roger M. et al.; "Acetyl Balance for the Acetylation of Wood Particles by a Simplified Procedure"; Holzforschung; 1990; vol. 44, No. 4; pp. 263-269.

Rowell, Roger M.; "Chemical Modification of Wood: Advantages and Disadvantages"; Proceedings Seventy-First Annual meeting of the American Wood-Preservers' Association; Apr. 1975; vol. 71, pp. 1-10.

Rowell, Roger M. et al.; "Dimensional Stability of Aspen Fiberboard Made from Acetylated Fiber"; Wood and Fiber Science; 1991; 23(4), pp. 558-566.

Rowell, Roger M. et al.; "Flakeboards Made from Aspen and Southern Pine Wood Flakes Reacted with Gaseous Ketene"; Journal of Wood Chemistry and Technology; 1986; 6(3), pp. 449-471.

Rowell, Roger M. et al.; "A Simplified Procedure for the Acetylation of Chips for Dimensionally Stabilized Particleboard Products"; Paperi ja Puu—Pepper och Trä; Oct. 1986; 68(10); pp. 740-744.

Rowell, Roger M. et al.; "A Simplified Procedure for the Acetylation of Hardwood and Softwood Flakes for Flakeboard Production"; Journal of Wood Chemistry and Technology; 1986; 6(3) pp. 427-448.

Rowell, Roger M. et al.; "Vapor Phase Acetylation of Southern Pine, Douglas-Fir, and Aspen Wood Flakes"; Journal of Wood Chemistry and Technology; 1986; 6(2), pp. 293-309.

(56) References Cited

OTHER PUBLICATIONS

Schwalbe, K.; "A Review of Investigations into the Modification of Wood by Acetylation, and Prospects for Further Research"; Proceedings of the Latvia University of Agriculture; 1977; Issue 130, pp. 3-9.

Sheen, A. D.; "The Preparation of Acetylated Wood Fibre on a Commercial Scale"; FRI Bulletin; 1992; 176, pp. 1-8.

Shiraishi, Nobuo and Yoshioka, Mariko; "Plasticization of Wood by Acetylation with Trifluoroacetic Acid Pretreatment"; Sen-I Gakkaishi; 1986; vol. 42, No. 6, pp. T346-T355.

Shumilin, U. A. et al.; "Effect of Method of Acetylation of Wood on Its Dimensional Stability"; Institute of Mechanics of Metal-Polymer Systems of the Academy of Sciences of Byelorussian SSR; 1987; 1, pp. 108-110.

Shvalbe, K. P. et al.; "Modification of Wood by Acetylation"; Tr. Latv. Sel'skokhoz Akad.; 1968; No. XXIII, pp. 145-146.

Singh, Devendra et al.; "Chemical Modification of Wood with Acetic Anhydride"; Journal of the Timber Development Association of India; Jan. 1992; vol. XXXVIII, No. 1; pp. 5-8.

Singh, Devendra et al.; "Acetylation: Effect on Wood Structure"; Journal of the Timber Development Association of India; Oct. 1998; vol. XLIV, No. 4; pp. 10-13.

Stamm, Alfred J. and Tarkow, Harold; "Dimensional Stabilization of Wood"; Journal of Physical and Colloid Chemistry; 1947; pp. 493-505.

Sun, Runcang and Sun, Xiao Feng; "Structural and Thermal Characterization of Acetylated Rice, Wheat, Rye, and Barley Straws and Poplar Wood Fibre"; Industrial Crops and Products; 2002; 16, pp. 225-235.

Tarkow, Harold et al.; "Acetylated Wood"; U. S. Department of Agriculture, Forest Products Lab, Agriculture-Madison, Wis.; 1946, Revised 1950; Report No. 1593.

Truksne, D. and Shvalbe, K.; "Hydrophobic Properties and Shape Stability of Acetylated Pinewood as a Function of Degree and Method of Acetylation"; Trudy LSKhA; 1977; No. 130, pp. 26-31.

Youngquist, J. A. and Rowell, R. M.; "Mechanical Properties and Dimensional Stability of Acetylated Aspen Flakeboard"; Holz als Roh—und Werkstoff; 1986; 44, pp. 453-457.

Zhici, Yin et al.; "A Study on Vapor Phase Acetylation of Wood"; Journal of Nanjing Technological College of Forest Products; 1982, No. 1, Issue 1, pp. 112-120.

Extended European Search Report dated Nov. 14, 2012 received in EP Patent Application No. 10792449.0-1211.

Gomez-Bueso, J. et al.; "Composites made from acetylated lignocellulosic fibers of different origin"; Holz als Roh—und Werkstoff; 2000; vol. 58, No. 1-2; pp. 9-14.

Hunt, George M. and Garratt, George A.; "Factors Affecting Penetration and Absorption"; Wood Preservation, Third Edition; 1967; pp. 234-235.

Reeb, James E.; "Drying Wood" Cooperative Extension Service, University of Kentucky, College of Agriculture; 1997.

Office Action date of mailing Apr. 30, 2012 received in co-pending U.S. Appl. No. 12/817,767; Mykytka et al.

Office Action date of mailing Nov. 19, 2012 received in co-pending U.S. Appl. No. 12/817,767; Mykytka et al.

Notification of Transmittal of the International Search Report and the Written Opinion of the International Searching Authority, or the Declaration date of mailing Jun. 2, 2013 received in International Application No. PCT/US2013/025269.

Office Action notification date Jul. 23, 2013 received in co-pending U.S. Appl. No. 12/817,767.

Beychok, M.; "Fossil fuel combustion flue gases"; The Encyclopedia of Earth [online], Jul. 2012 [retrieved Jul. 28, 2014], retrieved from http://www.eoearth.org/view/article/171355.

Boonstra, M. G. et al.; "Chemical Modification of Norway Spruce and Scots Pine—A $^{13}$C NMR CP-MAS Study of the Reactivity and Reactions of Polymeric Wood Components with Acetic Anhydride"; Holzforschung, vol. 50, No. 3; 1996; pp. 215-220.

Himmelblau, David M.; Basic Principles and Calculations in Chemical Engineering, Second Edition; 1967; pp. 137 and 179-180.

Ohkoshi, Makoto et al.; "Characterization of acetylated wood decayed by brown-rot and white-rot fungi"; Journal of Wood Science, vol. 45; 1999; pp. 69-75.

Prausnitz, J. M.; Molecular Thermodynamics of Fluid-Phase Equilibria; 1969; pp. 19-23.

Rowell, Roger M.; "Chemical Modification of Wood: Advantages and Disadvantages"; Proceedings of the American Wood-Preservers' Association; 1975; pp. 41-51.

U. S. Department of Health and Human Services and U. S. Department of Labor; "Occupational Safety and Health Guidelines for Acetic Anhydride"; The National Institutes for Occupational Safety and Health (NIOSH) [online]; 1992; [retrieved on Jul. 25, 2014] retrieved from http://www.cdc.gov/niosh/docs/81-123/pdfs/0003-rev.pdf.

U. S. Department of Health and Human Services and U. S. Department of Labor; "Occupational Safety and Health Guidelines for Acetic Acid"; The National Institute for Occupational Safety and Health (NIOSH) [online]; 1992 [retrieved on Jul. 25, 2014]; retrieved from http://www.cdc.gov/niosh/docs/81-123/pdfs/0002-rev.pdf Wakeling, R. N. et al.; "The susceptibility of acetylated Pinus radiate to mould and stain fungi"; prepared for the 23$^{rd}$ Annual Meeting of The International Research Group on Wood Preservation Group on Wood Preservation; May 11-15, 1992; 20 pages.

* cited by examiner

ESTERIFIED LIGNOCELLULOSIC MATERIALS AND METHODS FOR MAKING THEM

CROSS-REFERENCE TO RELATED APPLICATION

This application claims priority to U.S. Provisional Application Ser. No. 61/220,427 filed Jun. 25, 2009.

BACKGROUND OF THE INVENTION

Esterified lignocellulosic materials such as acetylated wood can be desirable in some applications because of their greater dimensional stability than untreated lignocellulosic materials and because of other qualities. These advantages exist for both esterified solid wood materials such as acetylated boards and lumber and lignocellulosic materials of small particle size that are acetylated then used in composite materials. However, there remains a continuing need to improve the favorable properties of these materials. There is also a continuing need for esterification processes that are efficient and cost-effective. There is also a continuing need for esterification processes that provide a high degree of esterification and consistency in the degree of esterification in a given batch of material.

SUMMARY OF THE INVENTION

The invention provides methods that include:

impregnating lignocellulosic material with a liquid that includes acetic anhydride to form an impregnated lignocellulosic material, and contacting the impregnated lignocellulosic material with a heated vapor to heat the impregnated lignocellulosic material to form acetylated lignocellulosic material, wherein the heated vapor includes an acetyl compound selected from acetic acid, acetic anhydride, or a combination thereof.

In some embodiments, the invention provides methods that include:

impregnating lignocellulosic material with a liquid that includes acetic anhydride to form an impregnated lignocellulosic material, and contacting the impregnated lignocellulosic material with a heated vapor to heat the impregnated lignocellulosic to form acetylated solid wood, wherein the vapor includes an acetyl compound selected from acetic anhydride or acetic acid, the acetyl compound is present in the vapor in an amount of at least about 50% by weight, and the lignocellulosic material is a solid wood. In some embodiments, the solid wood measures at least about 30 inches in one dimension and at least about 0.5 inches in two other dimensions. In some embodiments, the solid wood measures at least about 30 inches in one dimension and the solid wood is arrayed in stacks that are at least about ¼ inch in height.

The invention further provides acetylated lignocellulosic materials and articles containing or made of acetylated lignocellulosic materials.

DETAILED DESCRIPTION

The invention provides methods for acetylating lignocellulosic materials. Lignocellulosic material is impregnated with a composition containing acetic anhydride, then heated by contacting the impregnated lignocellulosic material with a heated vapor. The heated vapor includes acetic anhydride, acetic acid or both. The invention further provides acetylated lignocellulosic materials and compositions and articles made using acetylated lignocellulosic materials.

Lignocellulosic Material

Lignocellulosic material includes any material containing cellulose and lignin (and optionally other materials such as hemicelluloses). Some examples include wood, bark, kenaf, hemp, sisal, jute, crop straws, nutshells, coconut husks, grass and grain husks and stalks, corn stover, bagasse, conifer and hardwood barks, corn cobs, other crop residuals and any combination thereof.

In some embodiments, the lignocellulosic material is wood. Wood may be selected from any species of hardwood or softwood. In some embodiments the wood is a softwood. In some embodiments the wood is selected from pine, fir, spruce, poplar, oak, maple and beech. In some embodiments the wood is a hardwood. In some embodiments, the wood is selected from red oak, red maple, German beech, and Pacific albus. In some embodiments, the wood is a pine species. In some embodiments, the pine species is selected from Loblolly Pine, Longleaf Pine, Shortleaf Pine, Slash Pine, Radiata Pine and Scots Pine. In some embodiments, the wood is Radiata Pine. In some embodiments, the wood is from one or more of the four species commercially referred to as "Southern Yellow Pine" (Longleaf Pine, Shortleaf Pine, Slash Pine, Loblolly Pine). In some embodiments, the wood is selected from Longleaf Pine, Shortleaf Pine, and Loblolly Pine. In some embodiments, the wood is Loblolly Pine.

The lignocellulosic material may be in any form. Examples include shredded material (e.g. shredded wood), fiberized material (e.g. fiberized wood), wood flour, chips, particles, excelsior, flakes, strands, wood particles and materials such as trees, tree trunks or limbs, debarked tree trunks or limbs, boards, veneers, planks, squared timber, beams or profiles, and other cut lumber of any dimension.

In some embodiments, the lignocellulosic material is solid wood. As used throughout this application, "solid wood" shall refer to wood that measures at least about ten centimeters in at least one dimension but is otherwise of any dimension, e.g. lumber having nominal dimensions such as 2 feet×2 feet by 4 feet, 2 feet×2 feet by 6 feet 1 foot×1 foot by 6 feet, 2 inches×2 inches by four inches,×2 inches×2 inches by 6 inches, 1 inch×1 inch by 6 inches, etc., as well as objects machined from cut lumber (e.g. molding, spindles, balusters, etc.). Some examples include lumber, boards, veneers, planks, squared timber, beams or profiles. In some embodiments, the solid wood is lumber. Solid wood of any dimension may be used. In some embodiments, the solid wood measures at least about ten centimeters in at least one dimension and at least about 5 millimeters in another dimension. The longest dimension can measure, for example, about three feet, about four feet, about six feet, about eight feet, about ten feet, about twelve feet, about 14 feet, about 16 feet, etc. The longest dimension can also be described as being at least or greater than or equal to any of the foregoing values (e.g. at least about three feet, at least about four feet, greater than or equal to about 12 feet, etc). A second dimension of the wood may be the second longest dimension or may be equal the longest dimension. Some examples of the second longest dimension include about ¹⁄₁₀ inch, about ⅛ inch, about ⅙ inch, about ¼ inch, about ⅓ inch, about ⅜ inch, about 0.5 inch, about ⅝ inch, about 0.75 inches, about one inch, about 1.5 inches, about two inches, about three inches, about four inches, about five inches, about six inches, about eight inches, about nine inches, about ten inches, about 12 inches, about 14 inches, about 16 inches, about 18 inches, about 20 inches, about 24 inches, about three feet, about four feet, etc. The second longest dimension can also be described as being at least or greater than or equal to any of the foregoing values (e.g. at least about 1/10 inch, greater than or equal to about 0.5 inch, at least about 0.75 inch, etc). The third dimension can be the same as or different from the second dimension and can be, for example any of the values described above for the second dimension. In some embodiments, the wood measures the same length in all three dimensions. In some embodiments, the solid wood measures at least about 30 inches in its longest dimension and at least about 0.25 inch in two other dimensions. In some embodiments, the solid wood measures at least about 30 inches in its longest dimension and at least about 0.5 inch in two other dimensions. In some embodiments, the solid wood measures at least about 30 inches in its longest dimension and at least about 0.75 inch in two other dimensions. In some embodiments, the solid wood measures at least about 36 inches in its longest dimension and at least about 0.5 inch in two other dimensions. In some embodiments, the solid wood measures at least about 48 inches in its longest dimension and at least about 0.75 inch in two other dimensions. In some embodiments, the solid wood measures at least about 30 inches in at least one dimension, at least about 1.5 inches in another dimension and at least about 0.5 inch in a third dimension. In some embodiments, the solid wood measures at least about four feet in at least one dimension, at least about 1.5 inches in another dimension and at least about 0.5 inch in a third dimension. In some embodiments, the solid wood measures at least about eight feet in its longest dimension, at least about five inches in another dimension and at least about one inch in a third dimension. By referring to wood that "measures" specific dimensions, it is meant that the stated dimensions are actual measured dimensions and not nominal dimensions. However, these numbers are not limiting and embodiments exist wherein each of the foregoing figures represent nominal dimensions rather than measured dimensions. When two or three dimensions are identified, it is meant that each dimension is at about a 90 degree angle to other stated dimensions (for example, about 0.5 inch thickness by 1.5 inches width by about 30 inches length).

In some embodiments, one of the dimensions described in the foregoing paragraph is parallel to the direction of the grain of the solid wood. Thus, any of the measurements above may describe the dimension of the board in the axis of the grain of the solid wood. In some embodiments, the longest dimension is parallel to the direction of the grain of the solid wood.

The invention allows acetylation of multiple pieces of solid wood, including solid wood of any of the foregoing dimensions, to be esterified at once. In some embodiments, solid wood is arrayed in vertical stacks of two or more pieces with spacers ("stickers") disposed between the stacked pieces. Stickers are typically small rods of material having a selected thickness, and may be of any effective thickness. Any known or effective thickness or material of composition for stickers may be used. Some example thicknesses of stickers include about 1/4 inch, about 1/3 inch, about 3/8 inch, about 0.5 inch, about 5/8 inch, about 0.75 inches, about one inch, about 1.5 inches, about two inches. In some embodiments, efficiency of the acetylation process allows use of fewer stickers in a given stack. For example, in some embodiments, the stickers are arrayed such that a stack of wood is between each sticker, each stack has a thickness of about 0.5 inches and each stack contains multiple pieces of solid wood having dimensions less than about 0.5 inches are stacked between them (for example, four pieces of 1/8 inch thick veneer. Embodiments exist in which the thickness of the stacks of wood between stickers is about 0.75 inches, about one inch, about 1.5 inches, about two inches, about three inches, about four inches, about five inches, about six inches, about eight inches, about nine inches, about ten inches, about 12 inches, about 14 inches, about 16 inches, about 8 inches, about 20 inches, about 24 inches, about three feet about four feet, etc. The thicknesses of the wood in the foregoing sentence can reflect single pieces of wood of such thickness or stacks of wood of such thickness, e.g. for example, a single piece of wood about four inches thick or a stack of four pieces of wood that are each about one inch thick. The thicknesses of the stacks of wood can also be described as being at least or greater than or equal to any of the foregoing values (e.g. at least about 0.75 inch greater than or equal to about 1.5 inches, etc).

Lignocellulosic material may be of any compatible density prior to acetylation. In some embodiments, the wood has a density of between about 0.30 and about 0.65 grams per cubic centimeter, based on the dry weight of the material. In some embodiments, the wood has a density of between about 0.30 and about 0.55 grams per cubic centimeter, based on the dry weight of the material. In some embodiments, the wood has a density of between about 0.40 and about 0.65 grams per cubic centimeter, based on the dry weight of the material. In some embodiments, the wood has a density of between about 0.40 and about 0.60 grams per cubic centimeter, based on the dry weight of the material. In some embodiments, the wood has a density of between about 0.40 and about 0.625 grams per cubic centimeter, based on the dry weight of the material. In some embodiments, the wood has a density of between about 0.40 and about 0.50 grams per cubic centimeter, based on the dry weight of the material. In some embodiments, the wood has a density of between about 0.45 and about 0.55 grams per cubic centimeter, based on the dry weight of the material.

The lignocellulosic material can contain water prior to acetylation. For example, the lignocellulosic material can initially contain at least about 15 weight percent water, at least about 17 weight percent water, or at least about 19 weight percent water prior to esterification. In some embodiments, the lignocellulosic material can be dried or otherwise processed to remove water, to result in a dewatered lignocellulosic material. For example, the dried lignocellulosic material can have a water content of less than about 15 weight percent water, less than about 10 weight percent water, less than about 7.5 weight percent water, or less than about 5 weight percent water. Any effective method can be employed to achieve the desired water content of the lignocellulosic material prior to esterification. Some examples include kiln drying and/or solvent drying by impregnation with a liquid other than water. Any effective solvent may be used in solvent drying, including, for example, acetic acid, methanol, acetone, methyl isobutyl ketone, xylene and ester solvents (e.g. acetate esters such as isopropyl acetate, n-propyl acetate etc.). These processes may be assisted by applying vacuum, pressurized environments, or both, including cycles of multiple stages of vacuum, pressure, or both. Any effective solvent may be used in solvent drying, including, for example, acetic acid, methanol, acetone, methyl isobutyl ketone, xylene and ester solvents (e.g. acetate esters such as isopropyl acetate, n-propyl acetate etc.).

Impregnating the Lignocellulosic Material

In some embodiments, the lignocellulosic material is impregnated with a liquid containing acetic anhydride. Several methods for impregnating lignocellulosic material are known, and any effective method for impregnating the lignocellulosic material may be used. In some embodiments, impregnation occurs by contacting the lignocellulosic material with a liquid containing acetic anhydride, for example by immersing the lignocellulosic material in the liquid. In some embodiments, the pressure under which the impregnation occurs is controlled. For example, in some embodiments the lignocellulosic material is contacted with the liquid in a pressurized vessel or a vessel in which the pressure has been reduced below atmospheric pressure. Changes in pressure may occur before, during or after contact with the liquid. In some embodiments, pressure is varied during or in connection with impregnation. For example, in some embodiments the lignocellulosic material can be placed in a vessel in which vacuum is then created and maintained for a period of time to remove a desired degree of air or other gasses in the lignocellulosic material, then contacted with the liquid while maintaining vacuum, and then subjected to pressurization to facilitate impregnation. Multiple steps or cycles of pressurization, vacuum and/or restoration of atmospheric pressure as well as combinations of any or all of these conditions in any order or number of repetition may be used. Pressurization or repressurization may be accomplished by any means, including, but not limited to, adding atmospheric air, adding additional vapors or gasses such as inert gasses (e.g. nitrogen), adding acetic anhydride in liquid or gaseous form, or adding other materials.

The impregnating liquid may contain any effective amount of acetic anhydride. In some embodiments, the liquid contains at least about 50% acetic anhydride by weight. In some embodiments, the liquid contains at least about 60% acetic anhydride by weight. In some embodiments, the liquid contains at least about 75% acetic anhydride by weight. In some embodiments, the liquid contains at least about 80% acetic anhydride by weight. In some embodiments, the liquid contains at least about 85% acetic anhydride by weight. In some embodiments, the liquid contains at least about 90% acetic anhydride by weight. In some embodiments, the liquid contains at least about 95% acetic anhydride by weight. In some embodiments, the liquid contains at least about 99% acetic anhydride by weight. In some embodiments, the impregnating liquid that contains acetic anhydride also contains acetic acid. In some embodiments, the impregnating liquid may contain acetic anhydride and/or acetic acid that has been previously used in or generated as a byproduct of an acetylation process. Such material may or may not contain wood byproduct materials and derivatives thereof. Some examples include tannins and other polyphenolics, coloring matter, essential oils, fats, resins, waxes, gum starch, or metabolic intermediates.

Where impregnation occurs using a method that involves immersion of the lignocellulosic material in the impregnation fluid, some or all of the excess impregnation fluid may be drained or otherwise separated from the lignocellulosic material to allow heating to proceed.

Heating the Impregnated Material and the Resulting Reaction

After impregnation, the impregnated lignocellulosic material is heated. The heating accelerates the acetylation reaction. In some embodiments, the heat may first cause commencement or acceleration of reaction of acetic anhydride with water present in the lignocellulosic material. That reaction is exothermic and will result in further heating of the lignocellulosic material.

Heating is accomplished by contacting the material with one or more heated vapor streams. In some embodiments, acetylation occurs with an acetylation catalyst present. In some embodiments, the acetylation occurs without an effective amount of added acetylation catalyst. "Acetylation catalyst" refers to any compound that, combined with the lignocellulosic material before or during acetylation that measurably increases the rate of the acetylation reaction, reduces the amount of energy required to initiate the acetylation reaction, or both. In some embodiments, the catalyst operates through acid or base catalysis. Some examples of acetylation catalysts include pyridine, dimethylaminopyridine, trifluoroacetic acid, metal acetate salts (e.g. potassium acetate, sodium acetate, etc.), perchloric acid and perchlorate metal salts. "Effective amount" in connection with catalyst simply refers to the amount that, when present, results in such noticeable effects.

Any effective vapor or combination of vapors may be used. In some embodiments, the vapor stream includes and acetyl compound selected from acetic anhydride and acetic acid. In some embodiments, the vapor stream includes one or more of the same compounds that were used to impregnate the lignocellulosic material. For example, in some embodiments both the impregnating compound and the vapor stream include acetic anhydride. In some embodiments, the vapor stream includes a compound that has a boiling point lower than that of one or more of the compounds that was used to impregnate the lignocellulosic material. In some embodiments, the impregnating compound includes acetic anhydride, and the vapor stream includes acetic acid. In some embodiments, the use of heated vapor stream is effective to cause acetylation despite the absence of an effective amount of any added acetylation catalyst.

The vapor may be generated by any effective means. In some embodiments, the vapor is generated by contact or non-contact heating. Examples of non-contact heating involve use of steam or any other effective heat transfer method. In some embodiments, the heating involves a heat exchanger containing steam at a selected pressure. Examples include about 15 pounds/square inch, gauge pressure (psig), about 20 psig, about 25 psig, about 30 psig, about 40 psig, about 50 psig, about 60 psig, about 70 psig, about 80 psig, about 90 psig, about 100 psig, about 125 psig, about 150 psig, about 200 psig, about 250 psig and about 300 psig. The steam, pressure can also be described as being at least or greater than or equal to any of the foregoing values.

In some embodiments, the vapor is the result of boiling a composition that contains at least about 50% acetic anhydride by weight. In some embodiments, the vapor is the result of boiling a composition that contains at least about 60% acetic anhydride by weight. In some embodiments, the vapor is the result of boiling a composition that contains at least about 75% acetic anhydride by weight. In some embodiments, the vapor stream is the result of boiling a composition that contains acetic anhydride in a concentration of at least about 80% by weight. In some embodiments, the vapor is the result of boiling a composition that contains at least about 85% acetic anhydride by weight. In some embodiments, the vapor is the result of boiling a composition that contains at least about 90% acetic anhydride by weight. In some embodiments, the vapor is the result of boiling a composition that contains at least about 95% acetic anhydride by weight. In some embodiments, the vapor has the same percent anhydride content by weight as the liquid that was boiled to produce the vapor. In some embodiments, the vapor contains between about 50% and about 100% acetic anhydride by weight. In some embodiments, the vapor contains between about 75% and about 100% acetic anhydride by weight. In some embodiments, the vapor contains between about 85% and about 100% acetic anhydride by weight. In some embodiments, the vapor contains between about 90% and about 100% acetic anhydride by weight. In some embodiments, the vapor contains at least about 98% acetic anhydride by weight. The remainder of composition may be any compound or combination of compounds that does not unduly interfere with the esterification. In some embodiments, the boiled composition also contains one or more diluents in addition to the acetic anhydride.

Example diluents include acetic acid, xylene, methanol, acetone, methyl isobutyl ketone, ester solvents (e.g. acetate esters such as isopropyl acetate, n-propyl acetate etc.) and combinations of two or more of the foregoing. Thus, in some embodiments, a heated vapor stream is the result of boiling a composition that contains acetic anhydride in one of the percentages above and acetic acid (e.g., about 80:20 anhydride/acid, about 85:15 anhydride/acid, about 90:10 anhydride/acid, or about 95:5 anhydride/acid). Thus, in some embodiments, the vapor has an anhydride/acid ratio in the range from about 50:50 to about 99:1. In some embodiments, the vapor has an anhydride/acid ratio in the range from about 75:25 to about 99:1. In some embodiments, the vapor has an anhydride/acid ratio in the range from about 75:25 to about 95:1. In some embodiments, the vapor has about the same composition by weight as the liquid that was boiled to produce the vapor. In some embodiments, the acetic anhydride and/or acetic acid that has been previously used in is a byproduct of an acetylation process. Such material may or may not contain wood byproduct materials and derivatives thereof. Some examples include tannins and other polyphenolics, coloring matter, essential oils, fats, resins, waxes, gum starch, or metabolic intermediates.

In some embodiments, the vapor is the result of boiling a composition that contains at least about 50% acetic acid by weight. In some embodiments the vapor is the result of boiling a composition that contains at least about 60% acetic acid by weight. In some embodiments, the vapor is the result of boiling a composition that contains at least about 75% acetic acid by weight. In some embodiments, the vapor stream is the result of boiling a composition that contains acetic acid in a concentration of at least about 80% by weight. In some embodiments, the vapor is the result of boiling a composition that contains at least about 85% acetic acid by weight. In some embodiments, the vapor is the result of boiling a composition that contains at least about 90% acetic acid by weight. In some embodiments, the vapor is the result of boiling a composition that contains at least about 95% acetic acid by weight. In some embodiments, the vapor has the same percent acid content by weight as the liquid that was boiled to produce the vapor. In some embodiments, the vapor contains between about 50% and about 100% acetic acid by weight. In some embodiments, the vapor contains between about 75% and about 100% acetic acid by weight. In some embodiments, the vapor contains between about 85% and about 100% acetic acid by weight. In some embodiments, the vapor contains between about 90% and about 100% acetic acid by weight. In some embodiments, the vapor contains at least about 98% acetic acid by weight. The remainder of composition may be any compound or combination of compounds that does not unduly interfere with the esterification. In some embodiments, the boiled composition also contains one or more diluents in addition to the acetic acid. In some embodiments, the composition contains acetic anhydride, for example where the vapor is the result of boiling a composition that contains about 95% acetic acid and about 5% acetic anhydride by weight. Thus, in some embodiments the vapor stream is the result of boiling a composition that contains both acetic anhydride and acetic acid. In some embodiments, the vapor stream is the result of boiling a composition that contains acetic acid in one of the percentages above, and acetic anhydride (e.g., about 80:20 acid/anhydride, about 85:15 acid/anhydride, about 90:10 acid/anhydride, or about 95:5 acid/anhydride). Thus, in some embodiments, the vapor has an acid/anhydride ratio in the range from about 50:50 to about 99:1. In some embodiments, the vapor has an acid/anhydride ratio in the range from about 75:25 to about 99:1. In some embodiments, the vapor has an acid/anhydride ratio in the range from about 75:25 to about 95:1. The boiling can occur at a temperature effective to allow the vapor to boil and enter the pressurized reactor. In some embodiments, the boiled composition also contains one or more diluents in addition to the acetic acid. Example diluents include acetic acid, xylene, methanol, acetone, methyl isobutyl ketone, ester solvents (e.g. acetate esters such as isopropyl acetate, n-propyl acetate etc.) and combinations of two or more of the foregoing. In some embodiments, the vapor has the same composition by weight as the liquid that was boiled to produce the vapor. In some embodiments, the acetic acid that is a byproduct of an acetylation process. Such material may or may not contain wood byproduct materials and derivatives thereof. Some examples include tannins and other polyphenolics, coloring matter, essential oils, fats, resins, waxes, gum starch, or metabolic intermediates.

It has been found that in some embodiments use of acetic acid in the heated vapor stream results in faster launch times for the acetylation reaction compared to use of acetic anhydride. This is true despite the fact that acetic acid vapors have a lower boiling point than acetic anhydride and the fact that acetic acid is a byproduct of the acetylation reaction. By launch time, it is meant the time required for commencement of the acetylation reaction. This can readily be measured by monitoring the temperature at a location in the lignocellulosic material.

In some embodiments, the vapor heating of the impregnated lignocellulosic material is assisted by other means of applying heat. Any effective means of supplementing heat may be used. Some examples include application of electromagnetic radiation (e.g. microwave, infrared, or radiofrequency heating) or application of heat to the outer wall of the reactor (e.g. using a jacket of heat transfer medium). The exothermic reaction of acetic anhydride with water in the lignocellulosic material is also a source of heat. The exothermic acetylation reaction also provides a source of heat that may accelerate the reaction in other lignocellulosic material.

Other parameters can also be controlled during the heating and reaction. Pressure may be any effective pressure. In some embodiments, the pressure is maintained in the range of from about 20 to about 7700 Torr during the application of the heated vapor stream. In some embodiments, the pressure is maintained in the range of from about pressure to about 5000 Torr during the application of the heated vapor stream. In some embodiments, the pressure is maintained in the range of from about 1000 Torr to about 3500 Torr during the application of the heated vapor stream. In some embodiments, the pressure is maintained in the range of from about 1200 Torr to about 2600 Torr during the application of the heated vapor stream. In some embodiments, the pressure is maintained in the range of from about 750 to about 5000 torr during the application of the heated vapor stream during the application of the heated vapor stream. In some embodiments, the pressure is maintained in the range of from about 750 to about 2250 torr during the application of the heated vapor stream during the application of the heated vapor stream. In some embodiments, the pressure is maintained in the range of from about 1000 to about 2000 torr during the application of the heated vapor stream. In some embodiments, the pressure is maintained in the range of from about 1300 to about 1700 torr during the application of the heated vapor stream. In some embodiments, the pressure is maintained in the range of from about 500 to about 1500 torr during the application of the heated vapor stream. In some embodiments, the pressure is maintained in the range of from about 1500 to about 2500 torr during the application of the heated vapor stream. In some embodiments, the pressure is maintained in the range of from about 750 to about 1250 torr during the application of the heated vapor stream. In some embodiments, the pressure is maintained in the range of from about 900 to about 1110 torr during the application of the heated vapor stream. In some embodiments, the pressure is maintained in the range of from about 1750 to about 2250 torr during the application of the heated vapor stream.

Duration of the application of heated vapor is another process variable that can be manipulated. In some embodiments, application of heated vapor is discontinued when a specific point is reached, such as passage of a desired length of time after commencement of heat application. Some examples include about 20 minutes, about 25 minutes, about 30 minutes, about 40 minutes, about 45 minutes, about 50 minutes about 55 minutes, about 60 minutes, about 75 minutes, about 90 minutes, about 2 hours, about 3 hours, about 4 hours, about 5 hours, and about 6 hours. In some embodiments, application of heated vapor is discontinued when a desired temperature at one or more locations in the batch of lignocellulosic materials is measured. Some example temperatures include about 50° C., about 60° C., about 70° C., about 80° C., about 90° C., about 100° C., about 110° C., about 120° C., about 130° C., about 140° C., about 150° C., about 160° C., about 170° C., about 180° C. and about 190° C. Discontinuation can also be determined based on attainment of a selected internal pressure or in the drop of a temperature or pressure below a selected value toward the end of the reaction. Discontinuation can also be determined based on passage of a specified amount of time after attainment of a selected temperature. In some embodiments, applications of other sources of heat may also be discontinued at the same determined point or at a different point in the process. The foregoing examples are not limiting, and any acceptable endpoint can be used.

Resulting Acetylated Lignocellulosic Material

The invention also provides acetylated lignocellulosic materials made by the methods of the present invention. In some embodiments, application of one or more of the foregoing methods results in acetylated lignocellulosic material in which the degree of acetylation (as measured by percent bound acetyl groups) is at least about 10 weight percent. In some embodiments, the percent bound acetyl groups of the acetylated lignocellulosic material is at least about 15 weight percent. In some embodiments, the percent bound acetyl groups of the acetylated lignocellulosic material is at least about 16 weight percent. In some embodiments, the percent bound acetyl groups of the acetylated lignocellulosic material is at least about 17 weight percent. In some embodiments, the percent bound acetyl groups of the acetylated lignocellulosic material is at least about 18 weight percent. In some embodiments, the percent bound acetyl groups of the acetylated lignocellulosic material is at least about 19 weight percent. In some embodiments, the percent bound acetyl groups of the acetylated lignocellulosic material is at least about 20 weight percent. In some embodiments, the resulting percent bound acetyl can be from about 2 weight percent to about 30 weight percent, from about 10 weight percent to about 25 weight percent, or from about 15 weight percent to about 25 weight percent. For each of the above percentages, embodiments exist wherein the above percentages are found in an entire batch of lignocellulosic materials produced by an acetylation process. Embodiments also exist for each of the above percentages wherein the stated percent bound acetyl values are found in all non-heartwood in an entire batch of lignocellulosic material produced by an acetylation process. Embodiments also exist for each of the above percentages wherein the stated percent bound acetyl values are found in an entire piece of acetylated solid wood. Embodiments also exist for each of the above percentages wherein the stated percent bound acetyl values are found in all non-heartwood portions of an entire piece of acetylated solid wood. Embodiments also exist for each of the above percentages wherein the stated percent bound acetyl values are found in an entire group of stacks of acetylated solid wood (separated by stickers) from a given acetylation batch. Embodiments also exist for each of the above percentages wherein the stated percent bound acetyl values are found in all non-heartwood portions of an entire group of stacks of acetylated solid wood (separated by stickers) from a given acetylation batch. As used throughout this application, "non-heartwood" acetylated lignocellulosic material refers to material for which the source lignocellulosic material is not taken from the heartwood of a tree.

In some embodiments, the resulting acetylated lignocellulosic material in which the variation (i.e. the difference between the highest and lowest percentages of bound acetyl groups by weight found in a given batch) in the percent bound acetyl groups of acetylated non-heartwood lignocellulosic material is no more than about 5 percentage points. In some embodiments, the variation in the percent bound acetyl groups of acetylated non-heartwood lignocellulosic material is no more than about 3 percentage points. In some embodiments, the variation in the percent bound acetyl groups of acetylated non-heartwood lignocellulosic material is no more than about 2 percentage points. In some embodiments, variation in the percent bound acetyl groups of acetylated non-heartwood lignocellulosic material is no more than about 1 percentage point.

In some embodiments, the resulting acetylated lignocellulosic material in which the variation in the percent bound acetyl groups of non-heartwood lignocellulosic material having a density between about 0.45 and about 0.60 grams is no more than 5 about percentage points. In some embodiments, the variation in the percent bound acetyl groups of non-heartwood lignocellulosic material having a density between about 0.45 and about 0.60 grams is no more than about 3 percentage points. In some embodiments, the variation in the percent bound acetyl groups of non-heartwood lignocellulosic material having a density between about 0.45 and about 0.60 grams is no more than about 2 percentage points. In some embodiments, variation in the percent bound acetyl groups of non-heartwood lignocellulosic material having a density between about 0.45 and about 0.60 grams is no more than about 1 percentage point. "Non-heartwood lignocellulosic material having a density between about 0.45 and about 0.60 grams" refers to acetylated lignocellulosic material for which the source lignocellulosic material was not taken from the heartwood of a tree and had a density between about 0.45 and about 0.60 grams. Density values used in this application are based on dry weight.

In some embodiments, the resulting acetylated lignocellulosic material in which the variation in the percent bound acetyl groups of a given batch is no more than about 5 percentage points for the entire portion of such acetylated lignocellulosic material that has a density between about 0.45 and about 0.60. In some embodiments, the variation in the percent bound acetyl groups of a given batch is no more than about 3 percentage points for the entire portion of such acetylated lignocellulosic material that has a density between about 0.45 and about 0.60. In some embodiments, the variation in the percent bound acetyl groups of a given batch is no more than about 2 percentage points for the entire portion of such acetylated lignocellulosic material that has a density between about 0.45 and about 0.60. In some embodiments, variation in the percent bound acetyl groups of a given batch is no more than about 1 percentage points for the entire portion of such acetylated lignocellulosic material that has a density between about 0.45 and about 0.60.

As used herein, "percent bound acetyl" or "percent bound acetyl groups" is determined according to the following procedure. A sample of the lignocellulosic material having the thickness of drill bit shavings or smaller and weighing 0.5 g is placed in a convection oven set to 105° C. for 24 hours. Samples are then sealed in a capped, essentially airtight vial and allowed to cool to room temperature. Samples are weighed (to the nearest 0.1 mg) to determine the dry sample weight. 20 mL of 4% (w/v) sodium hydroxide (Mallinckrodt #7708-10, or equivalent) are pipetted into the vial, and the vial is sealed again and mechanically shaken for at least two hours with a shaker adjusted to the minimum speed necessary to keep the lignocellulosic materials suspended. 1 mL of the liquid supernatant is pipetted into a 100 mL flask, 1 mL of 85% phosphoric acid (Mallinckrodt #2796, or equivalent) is added, and the liquid is diluted to 100 mL with HPLC grade water (ASTM Type 1 HPLC grade). The resulting solution is mixed thoroughly and filtered using a 0.45 micron nylon filter. The % acetic acid content of the filtered solution is then determined by reversed phase liquid chromatography using a HYDROBOND PS-C18 column (MAC MOD Analytical Inc., Chadd's Ford, PA), or equivalent, the column being thermostatted to hold temperature at 35 degrees C., with detection using an Agilent 1100 Series Variable Wavelength Detector (Agilent Technologies, Inc., Santa Clara Calif.) or equivalent at 210 nm. The acetic acid is separated isocratically using 50 millimolar phosphoric acid for seven minutes with a methanolic column flush and reequilibration and the acetic acid (retention time approximately four minutes) is photometrically detected at 210 nm. A calibration curve is prepared over the range of 10-1000 ppm (corresponding to masses of 0.001-0.1 g of acetic acid in 100 mL calibration solutions). For the sample, the resultant area under the acetic acid peak is compared against the calibration curve to provide an acetic acid quantity in grams per 100 mL of sample solution. The determined grams of acetic acid ($g_{sample}$) is multiplied by 20 (because 1/20th of the sample extract was analyzed) and then by a ratio representing the mole weight of the acetyl group divided by the mole weight of acetic acid (that is, 43/60). The product is then divided by the dry weight of the sample in grams (Sample Wt (g)) then multiplied by 100 to express the value as a percent bound acetyl. This can be shown in the following equation: % Bound Acetyl=($g_{sample}$× 43/60×20×100)/Sample Wt (g).

Further Processing of Acetylated Lignocellulosic Materials

In some embodiments, the acetylated lignocellulosic material may be subjected to further processing. For example, in some embodiments the lignocellulosic material is processed to remove excess esterifying compound and/or reaction byproducts present in the lignocellulosic material. This can be performed in the same reaction vessel as the acetylation processes or in a different location. This removal process can be any process capable of lowering the content of acetic acid and/or acetic anhydride to any desired level. Examples of processes that can be employed in the present invention include, but are not limited to, application of electromagnetic radiation (e.g. microwave radiation, radiofrequency radiation, radiant infrared radiation etc.), with or without inert gas (e.g., nitrogen) flow, storing below atmospheric pressure, addition of heated vapor (e.g. steam) to the reaction vessel, addition of water to the reaction vessel, drying in a kiln, or combinations of two or more of the foregoing.

Acetylated lignocellulosic materials can also be subjected to any additional further treatments that may be desirable. Some examples include treatment with biocides, applications of stains or coatings, cutting into desired dimensions and shapes, chipping or refining into smaller materials, and the like.

Articles

The invention further provides articles containing or made of the lignocellulosic materials of the present invention. Some examples include, lumber, engineered wood, architectural materials (e.g. decking, joists, struts, banisters, indoor flooring, balusters, spindles, doors, trim, siding, molding, windows and window components, studs, etc.), playground equipment, fencing, furniture, utility poles, pilings, docks, boats, pallets and containers, railroad ties.

This invention can be further illustrated by the following examples of preferred embodiments thereof, although it will be understood that these examples are included merely for purposes of illustration and are not intended to limit the scope of the invention unless otherwise specifically indicated.

EXAMPLES

A sealed cylindrical horizontal steel reactor that was essentially airtight and watertight to serve as a reactor and that had dimensions of 9 feet in length and 10 inches in diameter was constructed. The working volume of the reactor was 36 gallons and the reactor was outfitted to hold between four and six boards having dimensions of eight feet length by 5.5 inches width by 1 inch thickness. The reactor was enclosed within a twelve inch pipe serving as an oil jacket that contained oil that could be heated by pumping through a heat exchanger. The reactor also had the ability to reduce and increase pressure.

In each example below, the following procedures were used: four 8'×5.5 inch×1 inch boards of Southern Yellow Pine were placed in the reactor (with an eight feet by 5.5 inch surface facing upwards) and separated from each other vertically by a rack that separated the boards by 0.5 inches and allowed free flow of gasses in the reactor between the boards. The 40 boards used in all of the 10 runs described below had been kiln dried and stored in a constant humidity chamber together as part of the same batch. Board "A" refers to the top board in the group; Board "B," the second board from the top; Board "C" was the second from the bottom; and Board "D" was positions in the bottom of the group. Board "C" from each run had been cut into two lengths of approximately four feet to allow a one inch sample to be removed from the middle prior to acetylation. The one inch sample was used for moisture testing, and the sample for each "C" board was found to have a moisture level between 6 and 7%. Boards had been pre-sorted by density into two groups. Lower density boards had dry board densities in the range of 0.48-0.52 grams per cubic centimeter. Higher density boards had dry board densities in the range of 0.54-0.58 grams per cubic centimeter. In some runs, the top two boards were from the higher density range and the bottom two boards were from the lower density range. In other runs, the top two boards were from the lower density range and the bottom two boards were from the higher density range. A thermocouple was inserted into a pre-drilled hole in the side of the bottom of Board "B" at a location in the approximate center of the board. The reaction vessel pressure was reduced to 40-60 mm Hg using a steam jet and held for 30 minutes. With continued vacuum, acetic anhydride (99%; 1% acetic acid) was added to fill the reactor such that the boards were completely submerged in the anhydride liquid. The reaction vessel pressure was then increased to 5000 mm Hg and held at that pressure for 40 minutes. Excess liquid (i.e. not absorbed into the boards) was drained from the vessel and the vessel pressure was reduced and maintained between 900 and 1100.

Heating of the oil jacket was then commenced. When the temperature of the hot oil reached 50° C., hot vapors were generated by feeding the liquid to be used in generating the vapors through a steam jacketed pipe (90 psig) and introducing the vapors into the reactor to deliver heat to the boards. Vapor delivery was through a vapor port located on the top side of the vessel on one end. The flow of vapor continued either until 120 minutes after the temperature of the hot oil reached 50° C. in some runs ("Long" Vapor Duration runs) or until the board temperature reached 100° C. in other runs ("Short" Vapor Duration runs). The vessel pressure during the acetylation was maintained at approximately 1000 mm Hg.

In Examples 1 through 4, the vapor was 99% acetic anhydride, 1% acetic acid, (this mixture is abbreviated as "AAn"). In Examples 5 through 8, the vapor was 95% acetic acid/5% acetic anhydride (this mixture is abbreviated as "AA"). In Comparative Examples 9 and 10 (C-9 and C-10) the tests were repeated without use of any vapor launch (wall heat only).

Temperature was measured and time required to launch the reaction was determined. "Time to launch" refers to the number of minutes after the oil temperature reached 50° C. (at which time vapor introduction commenced, when applicable) until the temperature measured in the thermocouple inside the board in the "B" position reached 100° C., which was selected because it is slightly above the temperature at which the acetylation reaction has been observed to begin accelerating rapidly. This temperature indicated the time at which the exothermic reactions in the boards begin. Results are resented in Table 1. "High Density Location" refers to whether the two boards from the group having the higher density are the bottom two or the top two boards in the batch. Thus, where "Bottom" is indicated the top two boards are from the lower density range and the bottom two boards are from the higher density range.

TABLE 1

PROCESS PARAMETERS FOR EXAMPLES

| Example | Vapor | Vapor Duration | High Density Location | Time to Launch (minutes) |
|---|---|---|---|---|
| 1 | AAn | Short | Bottom | 57 |
| 2 | AAn | Short | Top | 55 |
| 3 | AAn | Long | Bottom | 53 |
| 4 | AAn | Long | Top | 56 |
| 5 | AA | Short | Bottom | 43 |
| 6 | AA | Short | Top | 43 |
| 7 | AA | Long | Bottom | 47 |
| 8 | AA | Long | Top | 45 |
| C-9 | None | N/A | Bottom | 90 |
| C-10 | None | N/A | Top | 90 |

As can be seen, the time to launch the reaction in examples using AA 43-47 minutes while use of AAn vapors required 53-57 minutes. Thus on average, the launch time was 10 minutes faster with the use of AA vapors.

Percent acetyl was determined for each of the four boards in each run. Holes were drilled at or near the center point of the length and width of each board. The holes were drilled through the entire board and samples of the shavings from the entire drilling were used to determine percent bound acetyl. Since each Board "C" was cut into two pieces, holes were drilled at or near the center point of the length and width of each half of board C, designated "C-1" and "C-2." Results are presented in Table 2.

TABLE 2

BOUND ACETYL MEASUREMENTS FOR EXAMPLES

| Example | Board | Percent Bound Acetyl |
|---|---|---|
| 1 | A | 18.31 |
| 1 | B | 19.16 |
| 1 | C-1 | 16.45 |
| 1 | C-2 | 18.62 |
| 1 | D | 17.74 |
| 2 | A | 18.94 |
| 2 | B | 16.60 |
| 2 | C-1 | 19.73 |
| 2 | C-2 | 20.29 |
| 2 | D | 21.65 |
| 3 | A | 19.34 |
| 3 | B | 18.79 |
| 3 | C-1 | 19.57 |
| 3 | C-2 | 18.81 |
| 3 | D | 19.37 |
| 4 | A | 18.30 |
| 4 | B | 18.18 |
| 4 | C-1 | 20.19 |
| 4 | C-2 | 19.87 |
| 4 | D | 20.30 |
| 5 | A | 19.04 |
| 5 | B | 18.91 |
| 5 | C-1 | 17.84 |
| 5 | C-2 | 16.26 |
| 5 | D | 17.17 |
| 6 | A | 19.19 |
| 6 | B | 18.20 |
| 6 | C-1 | 20.15 |
| 6 | C-2 | 20.27 |
| 6 | D | 19.72 |
| 7 | A | 19.87 |
| 7 | B | 19.66 |
| 7 | C-1 | 19.42 |
| 7 | C-2 | 19.19 |
| 7 | D | 17.29 |
| 8 | A | 17.23 |
| 8 | B | 17.52 |
| 8 | C-1 | 19.59 |
| 8 | C-2 | 19.41 |
| 8 | D | 20.03 |
| C-9 | A | 19.93 |
| C-9 | B | 20.41 |
| C-9 | C-1 | 17.10 |
| C-9 | C-2 | 17.37 |
| C-9 | D | 17.33 |
| C-10 | A | 19.07 |
| C-10 | B | 17.69 |
| C-10 | C-1 | 19.25 |
| C-10 | C-2 | 19.94 |
| C-10 | D | 19.74 |

To verify that acetylation occurred throughout the boards, the board in the "A" position from Example 3 was sampled at a variety locations and depths. Samples were taken by drilling holes into one of the 8 foot by 5.5 inch surfaces of the board, drilling in a direction approximately parallel to the axis of the width of the board. Sampling Location I was located approximately 30 inches from one end of the board. Location II was located approximately 30 inches from the other end of the board (that is, approximately three feet from Location I). Location III is the approximate center of the length of the board. Location IV was located approximately 12 inches from one end of the board. Location V was located approximately 12 inches from the other end of the board (that is, approximately six feet from Location IV). At each of Locations I-V, drillings were made at three positions along the width of the board: one sample was taken the center of the width of the board and one sample was taken approximately 1" from the two opposite edges. For Locations I and II, samples were taken at three specific depths of the board, specifically ⅛ inch, ¼ inch and ⅜ inch. For each given depth at each of Locations I and II, samples at the three drilling positions along the width at that Location were combined. Thus, for example, the ⅛ depth inch sample at Location I was a composite of the material from ⅛ inch depth at the center of the width at Location I as well as the material from ⅛ inch depth at one inch from each of the two edges at Location I.

For each of Locations III, IV and V samples, holes were drilled through the entire board at each position. Thus, a drilling was made at the center of the width (Positions III-2, IV-2 and V-2) and drillings were made at one inch from each edge at each Location (Positions III-1, III-3, IV-1, IV-3, V-1 and V-3). A single sample was taken from the composite of shavings at each Position at Locations IV and V, and two samples were taken from the composite of shavings each Position at Location III (thus, at Position III-1, there are two samples, III-1A and III-1B). Percent bound acetyl was determined for each sample. Results are presented in Table 3. The first column identifies the Location and, where applicable, the Position. The "A" "B" for the Location III samples simply denote the two samples taken from shavings at each Position. As can be seen, thorough acetylation was achieved of both composite samples across the entire thickness of the board and at various depths.

TABLE 3

DETAILED SAMPLING
FOR EXAMPLE 3, BOARD A

| Location and Position | Depth (inches) | Percent Bound Acetyl |
| --- | --- | --- |
| I | ⅛ | 20.06 |
| I | ¼ | 19.59 |
| I | ⅜ | 19.84 |
| II | ⅛ | 20.23 |
| II | ¼ | 18.69 |
| II | ⅜ | 19.19 |
| III-1A | * | 20.23 |
| III-1B | * | 18.69 |
| III-2A | * | 19.19 |
| III-2B | * | 20.23 |
| III-3A | * | 18.69 |
| III-3B | * | 19.19 |
| IV-1 | * | 19.92 |
| IV-2 | * | 19.72 |
| IV-3 | * | 19.35 |
| V-1 | * | 18.88 |
| V-2 | * | 17.92 |
| V-3 | * | 18.81 |

A depth value of "*" denotes a sample that was taken from a drilling through the entire thickness of the board rather than a specific depth.

The invention has been described in detail with particular reference to preferred embodiments thereof, but it will be understood that variations and modifications can be effected within the spirit and scope of the invention.

What is claimed is:

1. A method comprising:
   impregnating solid wood with an impregnating liquid comprising acetic anhydride to form an impregnated solid wood, and
   contacting the impregnated solid wood with a heated vapor to heat the impregnated solid wood to form an acetylated solid wood, wherein the vapor includes an acetyl compound selected from acetic anhydride or acetic acid, the acetyl compound is present in the vapor in an amount of at least about 50% by weight and the solid wood measures at least about 30 inches in one dimension and at least about 0.25 inches in two other dimensions.

2. The method of claim 1, wherein the impregnating liquid further comprises acetic acid.

3. The method of claim 1, wherein the acetyl compound is acetic anhydride.

4. The method of claim 3, wherein the acetic anhydride is present in the heated vapor in an amount of at least about 75% by weight.

5. The method of claim 3, wherein the acetic anhydride is present in the heated vapor in an amount of at least about 90% by weight.

6. The method of claim 3, wherein the heated vapor further comprises acetic acid.

7. The method of claim 1, wherein the acetyl compound is acetic acid.

8. The method of claim 7, wherein the acetic acid is present in the heated vapor in an amount of at least about 75% by weight.

9. The method of claim 7, wherein the acetic acid is present in the heated vapor in an amount of at least about 90% by weight.

10. The method of claim 7, wherein the heated vapor further comprises acetic anhydride.

11. The method of claim 7, wherein the heated vapor further comprises water.

12. The method of claim 1, wherein the solid wood measures at least about 30 inches in one dimension, at least about 5 inches in a second dimension, and at least about 0.5 inches in a third dimension.

13. The method of claim 1, wherein the acetylated solid wood contains a percent bound acetyl of at least about 10% by weight.

14. The method of claim 1, wherein the longest dimension of the solid wood is parallel to the direction of the grain of the wood.

15. The method of claim 1, wherein the solid wood measures at least about 30 inches in a dimension that is parallel to the direction of the grain of the wood.

16. A method comprising:
    impregnating solid wood with an impregnating liquid comprising acetic anhydride to form an impregnated solid wood, and
    contacting the impregnated solid wood with a heated vapor to heat the impregnated solid wood to form acetylated solid wood, wherein the vapor includes an acetyl compound selected from acetic anhydride or acetic acid, the acetyl compound is present in the vapor in an amount of at least about 50% by weight, and the solid wood measures at least about 30 inches in one dimension and the solid wood is arrayed in stacks that are at least about 0.25 inch in height.

17. The method of claim 16, wherein the impregnating liquid further comprises acetic acid.

18. The method of claim 16, wherein the acetyl compound is acetic anhydride.

19. The method of claim 18, wherein the acetic anhydride is present in the heated vapor in an amount of at least about 75% by weight.

20. The method of claim 18, the acetic anhydride is present in the heated vapor in an amount of at least about 90% by weight.

21. The method of claim 18, wherein the heated vapor further comprises acetic acid.

22. The method of claim 16, wherein the acetyl compound is acetic acid.

23. The method of claim 22, wherein the acetic acid is present in the heated vapor in an amount of at least about 75% by weight.

24. The method of claim 22, wherein the acetic acid is present in the heated vapor in an amount of at least about 90% by weight.

25. The method of claim 22, wherein the heated vapor further comprises acetic anhydride.

26. The method of claim 22, wherein the heated vapor further comprises water.

27. The method of claim 16, wherein the solid wood is arrayed in stacks that are at least about 0.5 inch in height.

28. The method of claim 16, wherein the acetylated solid wood contains a percent bound acetyl of at least about 10% by weight.

29. The method of claim 17, wherein the longest dimension of the solid wood is parallel to the direction of the grain of the wood.

30. The method of claim 16, wherein the solid wood measures at least about 30 inches in a dimension that is parallel to the direction of the grain of the wood.

31. The method of claim 1, wherein solid wood measures at least about 48 inches in its longest dimension and at least about 0.75 inch in two other dimensions.

32. The method of claim 1, wherein the solid wood measures at least about 30 inches in at least one dimension, at least about 1.5 inches in another dimension and at least about 0.5 inch in a third dimension.

33. The method of claim 1, wherein the solid wood measures at least about four feet in at least one dimension, at least about 1.5 inches in another dimension and at least about 0.5 inch in a third dimension.

\* \* \* \* \*